United States Patent
Lemont, Jr. et al.

(10) Patent No.: US 7,487,984 B1
(45) Date of Patent: Feb. 10, 2009

(54) STEERING RACK WEAR COMPENSATOR

(75) Inventors: Charles J. Lemont, Jr., Commerce Township, MI (US); Jose M. Lopez, Brighton, MI (US); William C. Gregory, Milford, MI (US); Robert S. Brines, White Lake, MI (US); Scott R. Kloess, Rochester Hills, MI (US); Charu S. Hayes, Huntington Woods, MI (US); Darrin S. Mallard, Oxford, MI (US); Terry R. Peterson, Oakley, MI (US); David C. Pomerville, Brighton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/865,264

(22) Filed: Oct. 1, 2007

(51) Int. Cl.
*B62D 3/12* (2006.01)
*F16H 1/04* (2006.01)

(52) U.S. Cl. ............... 280/93.514; 74/422; 74/409; 74/388 PS

(58) Field of Classification Search ............... 180/428; 280/93.513, 93.514; 74/422, 409, 440, 388 PS; 384/40, 57
See application file for complete search history.

(56) References Cited

U.S. PATENT DOCUMENTS

| | | | | |
|---|---|---|---|---|
| 4,640,148 A | * | 2/1987 | Hasegawa | 74/422 |
| 4,788,878 A | * | 12/1988 | Morita et al. | 74/422 |
| 4,800,770 A | * | 1/1989 | Kobayashi et al. | 74/422 |
| 4,809,806 A | * | 3/1989 | Pietrzak et al. | 180/428 |
| 2002/0124670 A1 | * | 9/2002 | Bugosh | 74/388 OPS |
| 2003/0074996 A1 | * | 4/2003 | Camp | 74/422 |
| 2006/0185460 A1 | * | 8/2006 | Shiino et al. | 74/422 |
| 2007/0209463 A1 | | 9/2007 | Song et al. | |
| 2008/0202271 A1 | * | 8/2008 | Heo | 74/422 |

* cited by examiner

*Primary Examiner*—Eric Culbreth
*Assistant Examiner*—Joseph Rocca

(57) ABSTRACT

A wear compensator for use in a vehicle rack and pinion steering assembly and a method of biasing a rack against a pinion shaft gear in a rack and pinion steering assembly are disclosed. The wear compensator may include a rack follower, an adjuster plug, a wear cam and a torsion spring. The rack follower slides on the rack. The adjuster plug is retained by the steering gear housing and includes a plug cam surface. The wear cam includes a wear cam surface operatively engaging the plug cam surface, is mounted between the rack follower and the adjuster plug, and can rotate relative to the adjuster plug. The torsion spring connects between the adjuster plug and the wear cam in order to rotatably bias the wear cam relative to the adjuster plug.

20 Claims, 5 Drawing Sheets

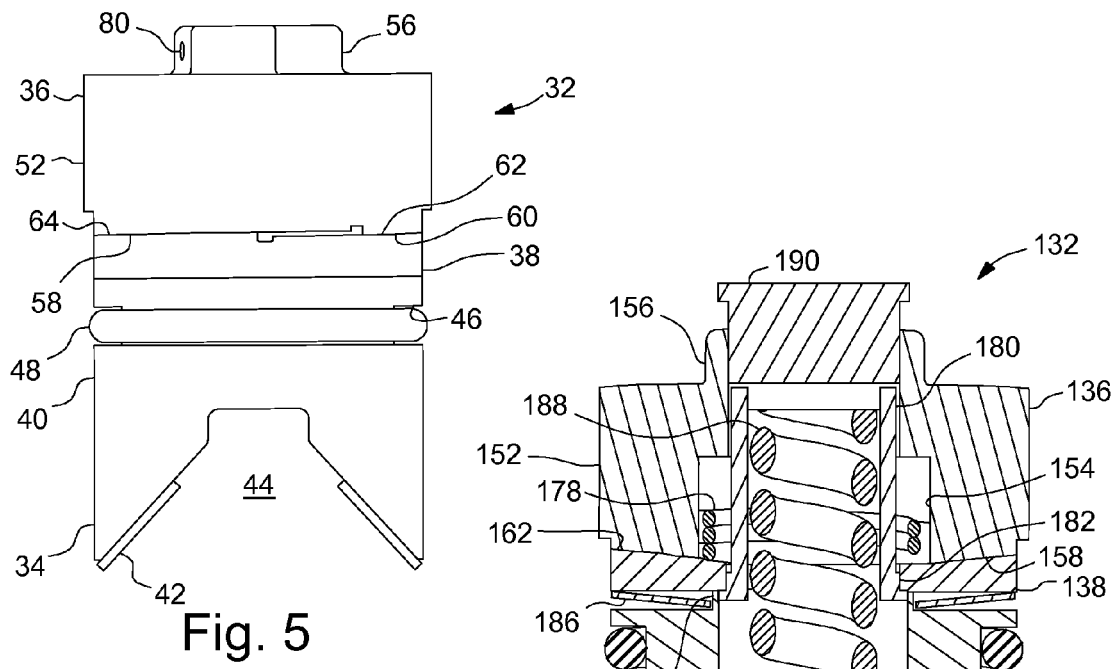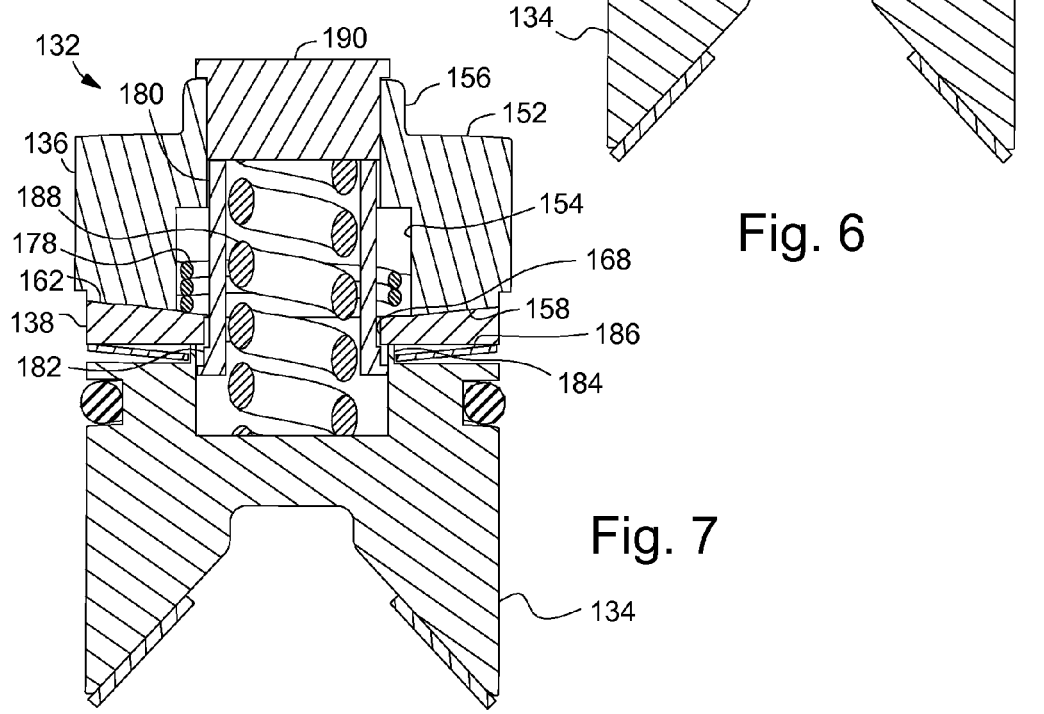

STEERING RACK WEAR COMPENSATOR

BACKGROUND OF INVENTION

The present invention relates generally to rack and pinion steering systems for vehicles, and more particularly to a wear compensator for a rack and pinion steering system.

Rack and pinion steering systems may have some type of mechanism for biasing the rack securely against the pinion shaft gear. This is done to help minimize the potential for rattles that might arise in the steering system, which may produce an undesirable noise heard by the vehicle operator. The rattle may arise due to wear of components in the system.

One such prior art compensation system provides a rack follower in sliding engagement with the rack in opposed relation to the pinion shaft gear, an adjusting screw that is threaded into the steering gear housing, and an axial compression spring (thrust spring) between the two. Then, as wear occurs, the spring accounts for the wear by continually biasing the rack follower into the rack, maintaining the rack in engagement with the pinion shaft gear. While this arrangement may work adequately for some vehicles, for others the wear in the system is still sufficient to result in rattles in the steering system that can be heard by vehicle operators, particularly when driving over rough roads.

SUMMARY OF INVENTION

An embodiment contemplates a wear compensator for use in a vehicle rack and pinion steering assembly including a rack in engagement with a pinion shaft gear in a steering gear housing. The wear compensator may include a rack follower, an adjuster plug, a wear cam, and a torsion spring. The rack follower may include a main body having shoes extending therefrom configured to engage and slide against the rack. The adjuster plug has a main body configured to be retained by the steering gear housing and has a plug cam surface. The wear cam is mounted between the rack follower and the adjuster plug and can rotate relative to the adjuster plug, and the wear cam includes a wear cam surface operatively engaging the plug cam surface. The torsion spring connects between the adjuster plug and the wear cam and rotationally biases the wear cam relative to the adjuster plug.

An embodiment contemplates a wear compensator for use in a vehicle rack and pinion steering assembly including a rack in engagement with a pinion shaft gear in a steering gear housing. The wear compensator may comprise a rack follower including a main body having shoes extending therefrom configured to slidably engage the rack; an adjuster plug having a main body configured to engage and be retained by the steering gear housing and including a plug cam surface; a wear cam mounted between the rack follower and the adjuster plug and rotatable relative to the adjuster plug, the wear cam including a wear cam surface operatively engaging the plug cam surface; a torsional biaser connected between the adjuster plug and the wear cam whereby the wear cam is rotatably biased relative to the adjuster plug; and a resilient member mounted between the rack follower and the wear cam.

An embodiment contemplates a method of biasing a rack against a pinion shaft gear in a rack and pinion steering assembly having a steering gear housing, the method comprising the steps of: rotationally biasing an adjuster plug relative to a wear cam with a wear cam surface operatively engaging a plug cam surface in a minimum height pre-installation position; mounting a rack follower in sliding engagement with the rack; mounting the adjuster plug in the steering gear housing with the wear cam mounted between the rack follower and the adjuster plug; and rotating the wear cam relative to the adjuster plug so that the wear cam surface and the plug cam surface move away from the minimum height pre-installation position as wear occurs in the rack and pinion steering assembly.

An advantage of an embodiment is that the wear compensator will compensate for steering rack assembly wear, resulting in the reduction or elimination of rattles.

An advantage of an embodiment is that the wear compensator resolves the rattle concern while still maintaining a similar size packaging space in the steering assembly as a conventional type of assembly.

BRIEF DESCRIPTION OF DRAWINGS

FIG. 5 is a view, on a reduced scale, similar to FIG. 1, but illustrating the wear compensator in a fully extended position.

FIG. 6 is a side, sectional view of a wear compensator in a pre-installation position, according to a second embodiment.

FIG. 7 is a view similar to FIG. 6, but illustrating the wear compensator in an installed position.

DETAILED DESCRIPTION

Figure 1:
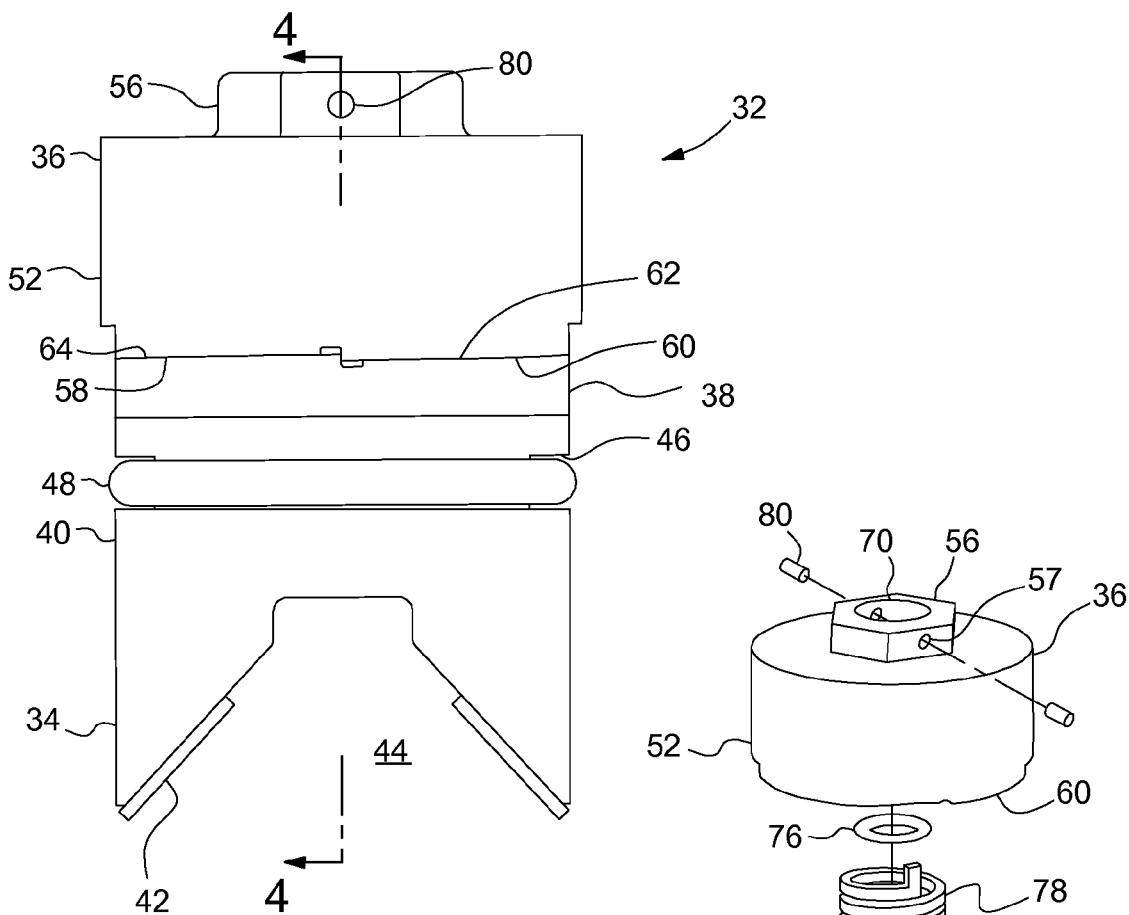
FIG. 1 is a side view of a wear compensator according to a first embodiment.
Figure 2:
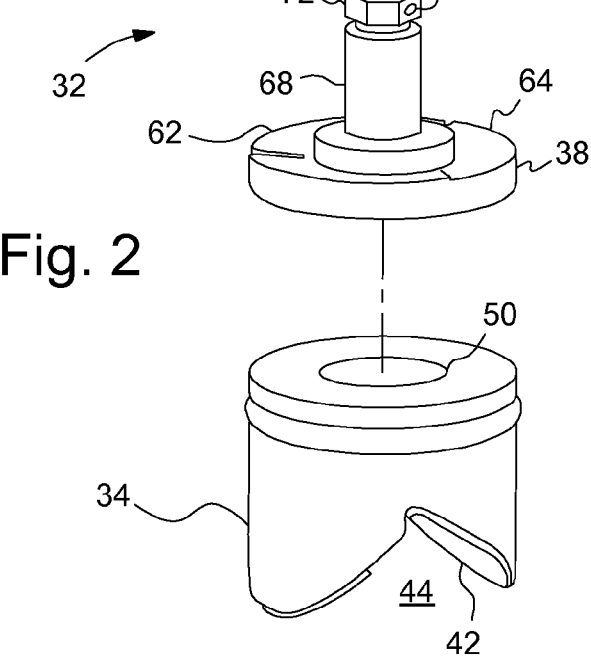
FIG. 2 is an exploded, perspective view of the wear compensator according to the first embodiment.
Figure 3:
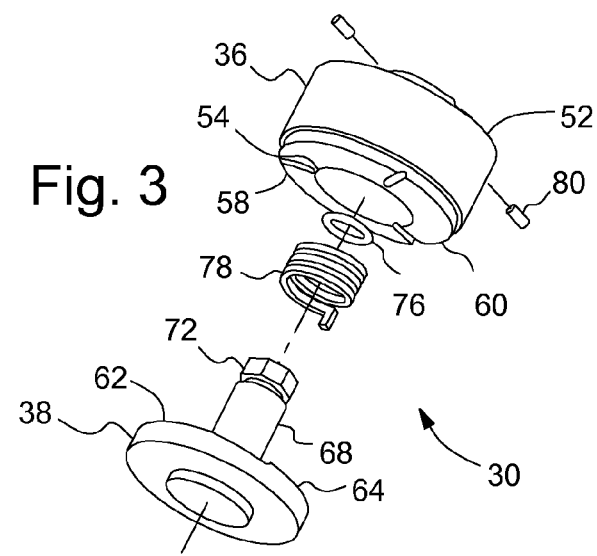
FIG. 3 is an exploded, perspective view similar to FIG. 2, but taken from a different angle.

Referring to FIGS. 1-5, a steering rack assembly of a rack and pinion steering system, indicated generally at 20, is shown. The rack and pinion steering system 20 includes a steering gear housing 22, within which a rack 24 and a pinion shaft gear 26 are mounted (shown only in FIG. 4). The rack 24 can slide in the gear housing 22 and includes rack teeth 28 that engage with teeth 30 on the pinion shaft gear 26.

The rack and pinion steering system 20 also includes a wear compensator 32. The wear compensator 32 mounts in the gear housing 22 adjacent to the rack 24 and in opposed relation to the pinion shaft gear 26. The wear compensator 32 includes a rack follower 34, an adjuster plug (nut) 36, and a wear cam 38. The rack follower 34 has a main body 40 from which a pair of angled shoes 42 extend. The shoes 42 form a rack recess 44 and engage the rack 24 in sliding engagement. The rack follower 34 also includes a seal recess 46, within which is mounted an O-ring seal 48, and an alignment recess 50.

The adjuster plug 36 has a main body 52 that defines a spring cavity 54 and a hex head 56. An outer, cylindrical surface of the main body 52 may include threads (not shown) or other means for securing the adjuster plug 36 in the gear housing 22. The hex head 56 can be gripped by a tool in order to screw the adjuster plug 36 into the gear housing 22. The hex head 56 has a pair of anti-rotation holes 57 extending radially through it. The adjuster plug 36 also includes a plug cam surface 58 that includes three ramps 60 spaced circumferentially around the plug cam surface 58. The plug cam surface 58 faces and operatively engages a wear cam surface 62 on the wear cam 38, which also includes three ramps 64. The term "operatively engages" or "operatively engaging," as used herein means that the two cam surfaces interact with each other to cause the desired result—an axial extension or retraction as the two rotate relative to each other. Thus, the two cam surfaces 58, 62 may be in surface contact with each other (as shown in FIGS. 1-5), or alternatively there may be, for example, roller or ball bearings between the two surfaces—in both cases the cam surfaces 58, 62 operatively engage each other. The plug cam surface 58 and the wear cam surface 62 may each have a corresponding radial slope as well in order to help maintain the adjuster plug 36 and wear cam 38 in a coaxial relationship. And, of course, other numbers of corresponding ramps per cam surface can be employed, if so desired.

Figure 4:
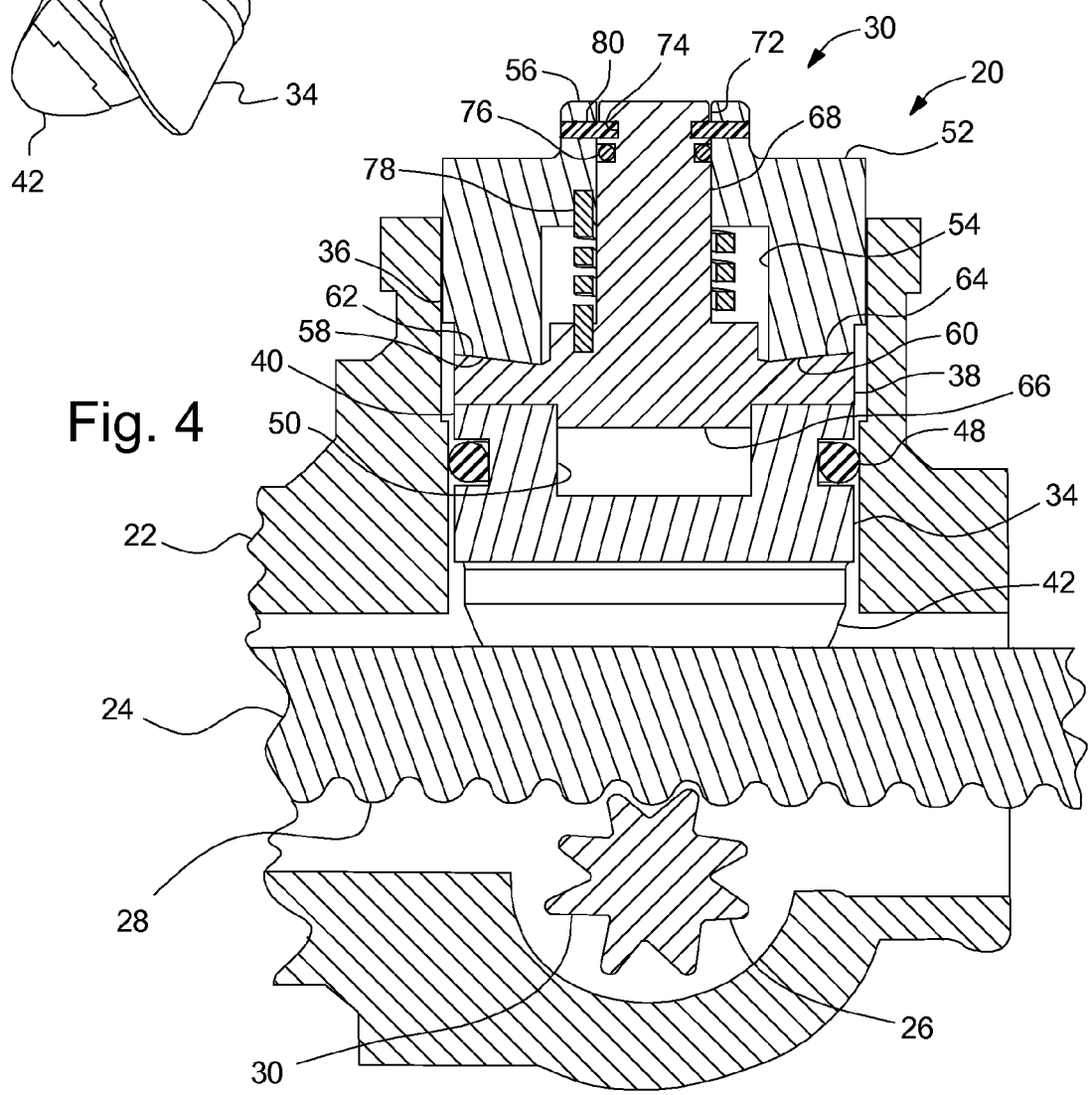
FIG. 4 is a somewhat schematic section cut, on a reduced scale, taken along line 4-4 in FIG. 1, also including other portions of a steering rack assembly.

The wear cam 38 includes a centering disk 66 that seats in the alignment recess 50 of the rack follower 34. The wear cam 38 also includes a cam main shaft 68 that extends through the spring cavity 54 and an adjustment opening 70 in the hex head 56. The end of the cam main shaft 68 includes an external ramp drive feature 72 that is situated within the adjustment opening 70 so that one can grip and rotate the external ramp drive feature 72 without rotating the hex head 56. A pair of anti-rotation recesses 74 extend radially into the cam main shaft 68 and are oriented to align with the anti-rotation holes 57 when the wear compensator 32 is in a fully retracted (pre-installation) position, as shown in FIGS. 1 and 4. An O-ring seal 76 is mounted around the cam main shaft 68.

Also mounted around the cam main shaft 68 is a torsion spring 78. The torsion spring 78 connects at a first end to the adjuster plug 36 and at a second end to the wear cam 38 and is twisted to rotationally bias the adjuster plug 36 relative to the wear cam 38. That is, when free to rotate relative to each other, the torsion spring 78 will cause the wear cam 38 to rotate relative to the adjuster plug 36 in a direction that causes the cam ramps 60, 64 to extend the wear compensator 32, as shown in FIG. 5. The rotation is initially prevented by pre-installation anti-rotation pins 80. These pins 80 may be formed as injected plastic as they are only needed for initial assembly.

The wear compensator 32 may be assembled by mounting the torsion spring 78 and O-ring 76 on the cam main shaft 68. The adjuster plug 36 is assembled over the cam main shaft 68 such that the plug cam surface 58 is in contact with the wear cam surface 62. The adjuster plug 36 is rotated relative to wear cam 38 while preventing the wear cam 38 from rotating, which will create the torsional bias in the torsion spring 78. The rotation is in a direction that will cause a minimum overall height for the wear compensator 32 (see FIG. 1). That is, the ramps 60 and ramps 64 will engage at the bottoms of each corresponding ramp. The pre-installation anti-rotation pins 80 are formed or inserted, as the case may be, in the anti-rotation holes 57 and anti-rotation recesses 74 to hold the rotational position of the adjuster plug 36 relative to the wear cam 38.

The O-ring seal 48 may be mounted on the rack follower 34 and the rack follower inserted into the gear housing 22 with the shoes 42 in surface contact with the rack 24. The wear cam 38 may be mounted onto the rack follower 34 with the centering disk 66 aligned with the alignment recess 50. The hex head 56 of the adjuster plug 36 may be engaged by a tool (not shown) to secure the adjuster plug 36 in the gear housing 22. Once secured to the desired position, the anti-rotation pins 80 may be removed to allow for rotation between the adjuster plug 36 and the wear cam 38.

In circumstances where the steering system 20 needs later servicing, since the pins 80 are no longer part of the assembly, the external ramp drive feature 72 can be employed to again create torsion in the torsion spring 78. That is, one may engage the external ramp drive feature 72 while engaging the hex head 56 to rotate one relative to the other.

During operation of the steering system 20 on a vehicle, the torsion spring 78 continually applies a bias to drive the ramps 64 of the wear cam 38 up the ramps 60 of the adjuster plug 36. As the components in a steering system 20 wear, the torsion spring 78 will cause the ramps 60, 64 to rotate relative to each other. As the ramps 60, 64 rotate relative to each other, the wear compensator 32 is axially lengthened, which compensates for the wear on the components. For example with a ramp pitch of about 1.4 millimeters and a relative rotation of about eighty degrees, about 0.36 millimeters of axial wear compensation is achieved. The ramps 60, 64 can continue to rotate until the fully extended position is reached (see FIG. 5).

FIGS. 6-7 illustrate a second embodiment. Since this embodiment is similar to the first, similar element numbers will be used for similar elements, but employing 100-series numbers. The rack follower 134 may be essentially unchanged from the first embodiment, with the exception of a washer retention flange 184. The washer retention flange 184 helps secure a washer 186, such as a wave or Belleville washer, in the wear compensator 132. Alternatively, an O-ring (not shown) in a groove may be employed instead of the washer. The washer 186 may allow for, for example, a small amount of axial motion in the rack follower 134 in order to allow for high and low spots on the rack (shown only in FIG. 4) and thermal expansion and contraction of the components. Such a resilient washer arrangement (or alternatively an O-ring) may be included in the embodiment of FIGS. 1-5, if so desired, in order to compensate for, for example, a crowned steering rack.

The wear cam 138 includes a retention hole 168 rather than a cam main shaft. The retention hole 168 may fit around a portion of the washer retention flange 184 to hold the wear cam 138 coaxial with the rack follower 134. A wear cam surface 162 still operatively engages a plug cam surface 158 on the adjuster plug 136, but the main body 152 of the adjuster plug 136 defines a different shaped spring cavity 154. A torsion spring 178 is still mounted in the spring cavity 154, but, in addition, an axial compression spring 188, pre-installation anti-rotation pins 180, and a threaded end plug 190 also extend into the spring cavity 154. The axial compression spring 188 is optional, extends between the adjuster plug 136 and the rack follower 134, and may have a lower loading than a conventional thrust spring.

The anti-rotation pins 180 extend from the spring cavity 154 through the retention hole 168 in the wear cam 138. The anti-rotation pins 180 include anti-rotation shoulders 182 adjacent to the retention hole 168. The anti-rotation shoulders 182 may be sized to press fit into the retention hole 168. Alternatively, the anti-rotation shoulders 182 may have a hex (or other similar) shape and fit into a corresponding shaped retention hole 168 to hold the wear cam 138 from rotating when the shoulders 182 are engaged in the retention hole 168. The threaded end plug 190 extends through the hex head 156 and aligns with the ends of the anti-rotation pins 180 opposite to the shoulders 182.

FIG. 6 shows the wear compensator 132 in a pre-installation position. In this position, the anti-rotation shoulders 182 of the anti-rotation pins 180 are engaged with the retention hole 168 of the wear cam 138, and the threaded end plug 190 is only partially received in the adjuster plug 136. The anti-rotation pins 180, then, prevent the adjuster plug 136 and wear cam 138 from rotating relative to each other, even with the bias of the torsion spring 178 acting on them. Thus, the cam surfaces 158, 162 are maintained in the minimum axial length position.

After the wear compensator 132 is installed in the gear housing (only shown in FIG. 4), the end plug 190 is screwed into the adjuster plug 136. As the end plug 190 is screwed in, it will push on the anti-rotation pins 180, eventually disengaging the anti-rotation shoulders 182 from the retention hole 168 (see FIG. 7). The torsion spring 178 is now free to cause rotation between the wear cam 138 and adjuster plug 136 as steering system components wear.

Figure 8:
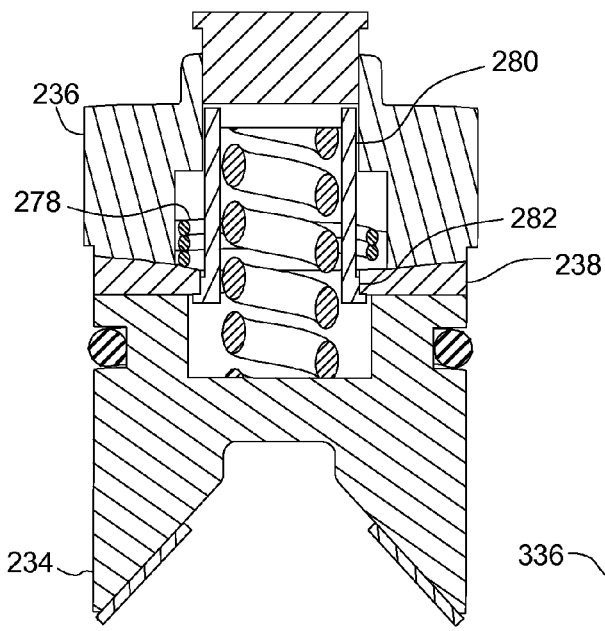
FIG. 8 is a side, sectional view of a wear compensator in a pre-installation position, according to a third embodiment.

FIG. 8 illustrates a third embodiment. Since this embodiment is similar to the second, similar element numbers will be used for similar elements, but employing 200-series numbers. The wear cam 238 is still mounted between the rack follower 234 and adjuster plug 236, with the anti-rotation shoulders 282 of the anti-rotation pins 280 initially maintaining the adjuster plug 236 and wear cam 238 against the bias of the torsion spring 278. However, in this embodiment, the wear cam 238 seats directly against the rack follower 234 without an intervening washer. While the resiliency of the washer is eliminated, the overall package height is reduced.

Figure 9:
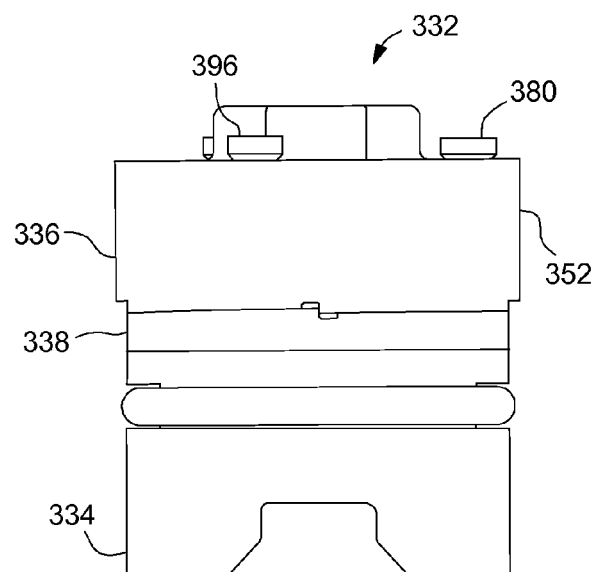
FIG. 9 is a side view of a wear compensator, in a pre-installation position, according to a fourth embodiment.
Figure 10:
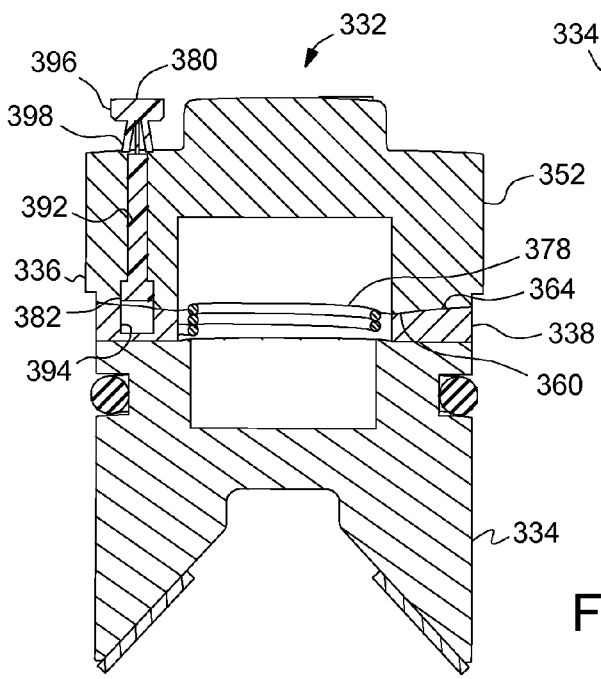
FIG. 10 is a side, sectional view of the wear compensator of the fourth embodiment, but shown in an installed position.
Figures 11, 12:
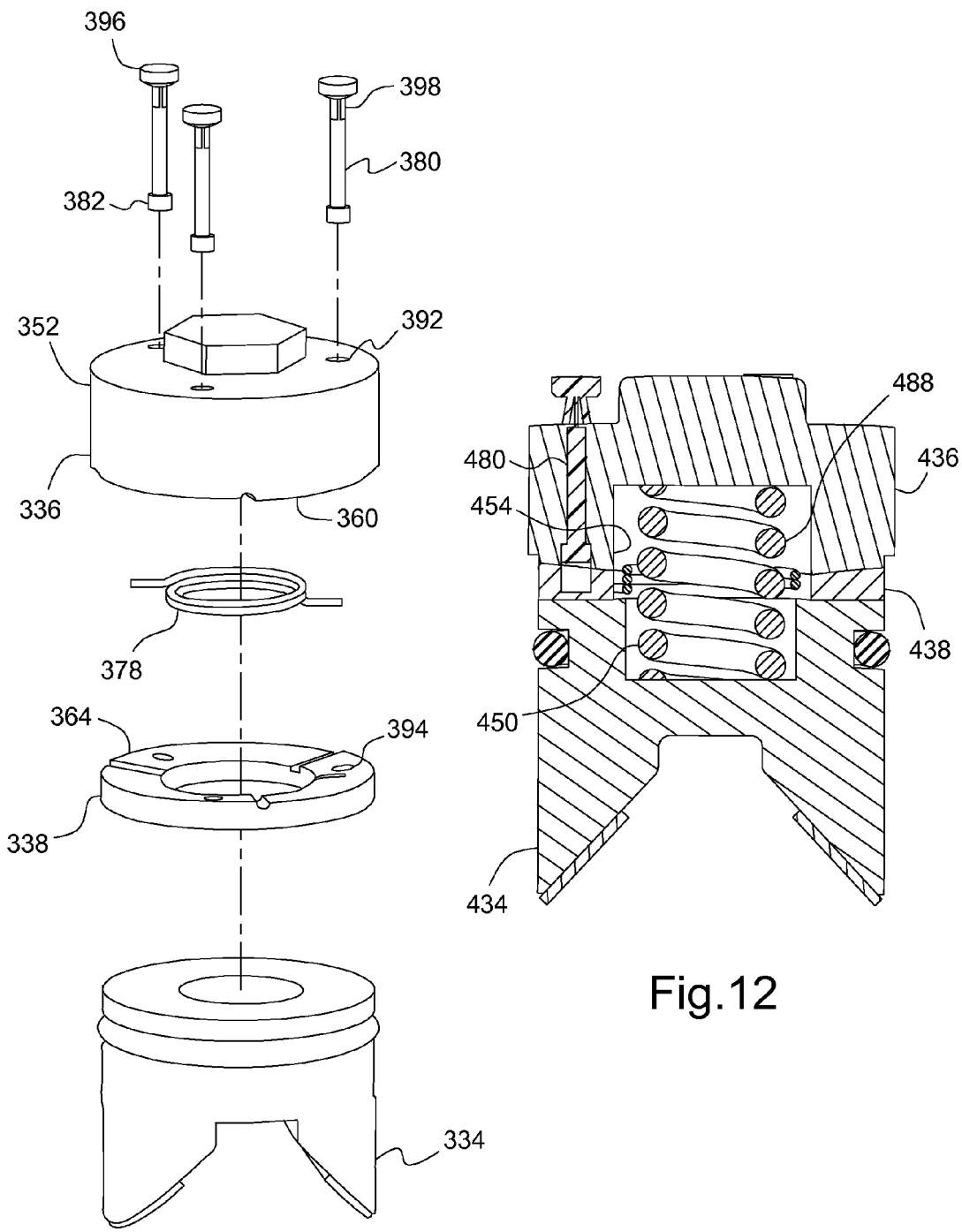
FIG. 11 is an exploded, perspective view of the wear compensator according to the fourth embodiment, with latch flanges shown in a retracted position.
FIG. 12 is a side, sectional view of a wear compensator, in an installed position, according to a fifth embodiment.

FIGS. 9-11 illustrate a fourth embodiment. Since this embodiment is similar to the first, similar element numbers will be used for similar elements, but employing 300-series numbers. The rack follower 334 can be essentially the same as in the first embodiment. The wear cam 338 mounts between the rack follower 334 and the adjuster plug 336, with the torsion spring 378 engaging the adjuster plug 336 and wear cam 338. In this embodiment, there also may be an optional wave or Belleville washer (not shown in FIGS. 9-11) between the rack follower 334 and the wear cam 338.

Three pre-installation anti-rotation pins 380 now each slide within a respective pin hole 392 extending through the adjuster plug main body 352. Each anti-rotation pin 380 includes a shoulder 382 that can slide into a respective anti-rotation hole 394 in the wear cam 338, and a release head 396 having latch flanges 398 extending therefrom.

In the fully retracted, pre-installation position (shown in FIG. 9), the torsion spring 378 is wound up so that the adjuster plug ramps 360 align with the wear cam ramps 364 in a minimum height orientation, and the shoulders 382 of the anti-rotation pins 380 extend into the anti-rotation holes 394 to prevent the wear cam 338 from rotating relative to the adjuster plug 336.

Once the wear compensator 332 is mounted in the gear housing (only shown in FIG. 4), the release heads 396 are pulled away from the adjuster plug 336 until the latch flanges 398 spring free of the pin holes 392, preventing the anti-rotation pins 380 from sliding back into the adjuster plug 336 (shown in FIG. 10). As the release heads 396 are pulled away, this also pulls the shoulders 382 out of the anti-rotation holes 394, rotationally freeing the wear cam 338 relative to the adjuster plug 336.

FIG. 12 illustrates a fifth embodiment. Since this embodiment is similar to the fourth embodiment, similar element numbers will be used for similar elements, but employing 400-series numbers. The same pre-installation anti-rotation pins 480 are employed to initially hold the wear cam 438 relative to the adjuster plug 436 against the bias of the torsion spring 478. This embodiment differs from the fourth in that an axial compression spring 488 extends between the alignment recess 450 of the rack follower 434 and the spring cavity 454 of the adjuster plug 436.

While certain embodiments of the present invention have been described in detail, those familiar with the art to which this invention relates will recognize various alternative designs and embodiments for practicing the invention as defined by the following claims.

What is claimed is:

1. A wear compensator for use in a vehicle rack and pinion steering assembly including a rack in engagement with a pinion shaft gear in a steering gear housing, the wear compensator comprising:
   a rack follower including a main body having shoes extending therefrom configured to slidably engage the rack;
   an adjuster plug having a main body configured to engage and be retained by the steering gear housing and including a plug cam surface;
   a wear cam mounted between the rack follower and the adjuster plug and rotatable relative to the adjuster plug, the wear cam including a wear cam surface operatively engaging the plug cam surface; and
   a torsion spring connected between the adjuster plug and the wear cam whereby the wear cam is rotatably biased relative to the adjuster plug.

2. The wear compensator of claim 1 including a pre-installation anti-rotation pin connected between the adjuster plug and the wear cam and configured to selectively prevent rotation of the adjuster plug relative to the wear cam.

3. The wear compensator of claim 2 wherein the adjuster plug includes a radially extending anti-rotation hole, and the wear cam includes a cam main shaft extending adjacent to the anti-rotation hole, the main shaft including an anti-rotation recess that aligns with the anti-rotation hole when the wear cam is rotationally located relative to the adjuster plug in a pre-installation position, the anti-rotation hole and the anti-rotation recess configured to receive the pre-installation anti-rotation pin.

4. The wear compensator of claim 3 wherein the adjuster plug includes an adjustment opening and the cam main shaft includes an external ramp drive feature that extends into the opening and is configured to be accessible from outside of the adjuster plug, whereby the ramp drive feature allows the wear cam to be rotated relative to the adjuster plug.

5. The wear compensator of claim 2 wherein the adjuster plug includes an axially extending anti-rotation hole, with the pre-installation anti-rotation pin slidably received in the anti-rotation hole, and the wear cam includes an anti-rotation recess that aligns with the anti-rotation hole when the wear cam is rotationally located relative to the adjuster plug in a pre-installation position, the anti-rotation recess being configured to slidably receive the pre-installation anti-rotation pin.

6. The wear compensator of claim 5 wherein the pre-installation anti-rotation pin includes a release head extending from the adjuster plug and a plurality of latch flanges extending radially and axially outward from the release head.

7. The wear compensator of claim 2 wherein the adjuster plug includes a spring recess within which is mounted the pre-installation anti-rotation pin, the pre-installation anti-rotation pin including a shoulder slidably but non-rotatably engageable with a retention hole in the wear cam, the adjuster plug also including an end plug received in the spring recess and in contact with the pre-installation anti-rotation pin.

8. The wear compensator of claim 2 including one of a wave and a Belleville washer mounted between the rack follower and the wear cam.

9. The wear compensator of claim 1 including a resilient member mounted between the rack follower and the wear cam.

10. The wear compensator of claim 1 including an axial compression spring mounted between the rack follower and the adjuster plug.

11. The wear compensator of claim 1 wherein the plug cam surface includes three ramps and the wear cam surface includes three corresponding ramps.

12. The wear compensator of claim 1 wherein the plug cam surface is in surface contact with the wear cam surface.

13. A wear compensator for use in a vehicle rack and pinion steering assembly including a rack in engagement with a pinion shaft gear in a steering gear housing, the wear compensator comprising:
- a rack follower including a main body having shoes extending therefrom configured to slidably engage the rack;
- an adjuster plug having a main body configured to engage and be retained by the steering gear housing and including a plug cam surface;
- a wear cam mounted between the rack follower and the adjuster plug and rotatable relative to the adjuster plug, the wear cam including a wear cam surface operatively engaging the plug cam surface;
- a torsional biaser connected between the adjuster plug and the wear cam whereby the wear cam is rotatably biased relative to the adjuster plug; and
- a resilient member mounted between the rack follower and the wear cam.

14. The wear compensator of claim 13 wherein the resilient member is one of a wave and a Belleville washer.

15. The wear compensator of claim 13 including a pre-installation anti-rotation pin connected between the adjuster plug and the wear cam and configured to selectively prevent rotation of the adjuster plug relative to the wear cam.

16. The wear compensator of claim 13 wherein the plug cam surface includes three ramps and the wear cam surface includes three corresponding ramps.

17. A method of biasing a rack against a pinion shaft gear in a rack and pinion steering assembly having a steering gear housing, the method comprising the steps of:
- (a) rotationally biasing an adjuster plug relative to a wear cam with a wear cam surface operatively engaging a plug cam surface in a minimum height pre-installation position;
- (b) mounting a rack follower in sliding engagement with the rack;
- (c) mounting the adjuster plug in the steering gear housing with the wear cam mounted between the rack follower and the adjuster plug; and
- (d) rotating the wear cam relative to the adjuster plug so that the wear cam surface and the plug cam surface move away from the minimum height pre-installation position as wear occurs in the rack and pinion steering assembly.

18. The method of claim 17 wherein step (a) is further defined by the rotational bias being generated by a torsion spring mounted between the adjuster plug and the wear cam.

19. The method of claim 17 wherein step (a) is further defined by selectively holding the wear cam and adjuster plug in the minimum height pre-installation position with at least one pre-installation anti-rotation pin.

20. The method of claim 17 including the step of providing an axial biaser between the rack follower and the wear cam.

* * * * *